United States Patent [19]

Nagano

[11] Patent Number: 4,543,847
[45] Date of Patent: Oct. 1, 1985

[54] BRAKE OPERATING DEVICE FOR A BICYCLE

[75] Inventor: Masashi Nagano, Izumi, Japan

[73] Assignee: Shimano Industrial Company Limited, Osaka, Japan

[21] Appl. No.: 567,657

[22] Filed: Jan. 3, 1984

[30] Foreign Application Priority Data

Jan. 8, 1983 [JP] Japan ................. 58-1206[U]

[51] Int. Cl.[4] ............... B62K 23/06; B62L 3/02
[52] U.S. Cl. ................... 74/480 R; 74/489
[58] Field of Search ............ 74/480 R, 489

[56] References Cited

U.S. PATENT DOCUMENTS

| | | | |
|---|---|---|---|
| 3,403,577 | 10/1968 | Ozaki | 74/489 X |
| 3,693,469 | 9/1972 | Ozaki | 74/489 |
| 3,776,061 | 12/1973 | Yoshigai | 74/489 X |
| 3,977,270 | 8/1976 | Cristie | 74/489 X |
| 4,196,643 | 4/1980 | Nagano | 74/489 X |
| 4,259,879 | 4/1981 | Watarai | 74/489 X |
| 4,263,818 | 4/1981 | Ozaki | 74/489 X |
| 4,270,481 | 6/1981 | Watarai | 74/489 X |
| 4,304,145 | 12/1981 | Shimano | 74/489 X |
| 4,352,303 | 10/1982 | Christner | 74/489 |
| 4,459,871 | 7/1984 | Shimano | 74/489 X |

*Primary Examiner*—Alan Cohan
*Assistant Examiner*—John A. Rivell
*Attorney, Agent, or Firm*—Stevens, Davis, Miller & Mosher

[57] ABSTRACT

A brake operating device for a bicycle is provided with a main lever, a lever shaft to support the main lever, a pivot shaft screwing with an axial end of the lever shaft, and an auxiliary lever supported to the pivot shaft. A locking unit is provided for preventing looseness of the pivot shaft with respect to the lever shaft. The locking means is provided with a coiled spring having a coil portion wound onto the outer periphery of a stem of the pivot shaft and a retaining end in continuation of the coil portion, and a retaining portion receiving therein the retaining end of coiled spring. When the pivot shaft is intended to unscrew, the coil portion of the coiled spring contracts in diameter to impede the rotation of the pivot shaft.

7 Claims, 6 Drawing Figures

BRAKE OPERATING DEVICE FOR A BICYCLE

FIELD OF THE INVENTION

This invention relates to a brake operating device for a bicycle, and more particularly to a brake operating device for a bicycle, comprising a bracket member having a lever shaft fixed to a handle, a main lever supported swingably to the lever shaft at the bracket member, a pivot shaft which screws with an axial end of the lever shaft, and an auxiliary lever supported swingably to the pivot shaft, with the auxiliary lever being associated with the main lever so that the bicycle brake is adapted to be actuated through a control wire operated by the main or auxiliary lever.

BACKGROUND OF THE INVENTION

Generally, a brake operating device is mounted to a bent section at a drop-type handle of the bent sections and a straight section. A cyclist grips by his hands the bent or straight sections and turns the main or auxiliary lever by the finger of his hand gripping the handle, thereby exerting the braking action.

Since the auxiliary lever is supported to the lever shaft through the pivot shaft screwed therewith, the pivot shaft is loosened by frequent operation of the auxiliary lever or by vibrations caused during the bicycle's running and leads to play with respect to the lever shaft. This creates a problem in that the proper braking action becomes not easy.

In other words, the main lever is supported to the lever shaft through its boss inserted into the bracket member, thereby not loosening with respect to the lever shaft. The auxiliary lever, however, is supported at the outside of the bracket member through the pivot shaft so that the pivot shaft, when loosened, gives play on the auxiliary lever with respect to the lever shaft.

SUMMARY OF THE INVENTION

In the light of the above problem, this invention has been designed. An object of the invention is to provide a brake operating device for a bicycle, which uses a coiled spring having a coil portion and one retaining end so that the retaining end is retained merely to, for example, the lever shaft, thereby impeding looseness of the pivot shaft reliably by such simple construction.

In order to attain the above object, this invention has been designed to use a locking means comprising a coiled spring having a coil portion wound on the outer periphery of the pivot shaft and one retaining end in continuation of the coil portion, and also comprising a retaining portion receiving therein the retaining end so that when the pivot shaft is intended to rotate in the unscrewing direction, the coil portion contracts in diameter to thereby prevent the pivot shaft from being unscrewed.

Also, it is preferable for preventing the looseness of the pivot shaft to make an inner diameter of the coil portion equal to or sightly smaller than an outer diameter of the stem of the pivot shaft, and it is further preferable to spiral the coil portion in the same direction as the screwing of a screw thread at the pivot shaft.

These and other objects of the invention will become more apparent in the detailed description and examples which follow.

DETAILED DESCRIPTION OF THE INVENTION

Figure 1:
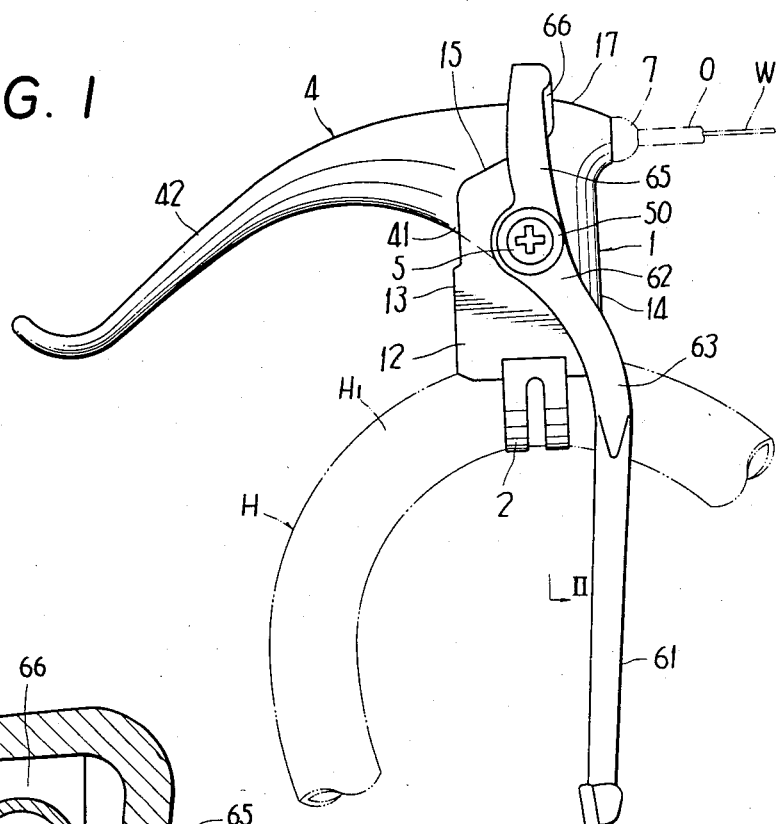
FIG. 1 is a front view of an embodiment of a brake operating device of the invention.

A brake operating device is shown which is mounted to a U-like bent section $H_1$ of a drop-type handle H comprising the bent sections and a straight section (not shown) and comprises a box-like bracket member 1 having a lever shaft 3 fixed to the bent section H, through a tightening band 2; a main lever 4 supported swingably to the lever shaft 3; a pivot shaft 5 having a screw thread 51 screwable with an axial end of lever shaft 3, a stem 52 and a head 53; and an auxiliary lever 6 supported swingably to the pivot shaft 5.

The bracket member 1 comprises a pair of side walls 11 and 12 opposite to each other, and front and rear walls 13 and 14 in continuation of the side walls 11 and 12 respectively, with the front wall 13 being smaller in height than the rear wall 14 and forming a forward opening 15. Rear wall 14 carries at the upper portion a holder 7 for an outer sheath O guiding a control wire W. A pair of through bores 16 are provided at the centers of both side walls 11 and 12, the lever shaft 3 being supported across the through bores 16.

The lever shaft 3 is provided at the lengthwise center thereof with a through bore 31 perforating the lever shaft 3 perpendicularly to the axis thereof and at one axial end with a threaded bore 32, so that a mounting bolt 8 is inserted into the through bore 31 and screws at the tip with a nut 9 retained at both ends thereof to the tightening band 2. Mounting bolt 8 is tightened to pull the tightening band 2 upwardly, and simultaneously the bracket member 1 is lowered to be fixed to the bent section $H_1$.

The main lever, as shown in FIG. 1, is provided with a boss 41 and a grip 42 and formed mainly of a metal plate so that the boss 41 is bent to an inverse-U-like shape in section and the grip 42 to a box-like shape closed in section. The boss 41 of main lever 4 is provided with a pair of shaft bores 43 and is supported swingably to the lever shaft 3 through bushes 10 fitted into the shaft bores 43 respectively. Boss 41 also includes a pair of support bores 44, into which a wire retainer 20 for one end of control wire W is pivoted.

The auxiliary lever 6 comprises a grip 61 extending along the straight section of drop-type handle H, a boss 62 extending along the bracket member 1, and a connecting portion connecting the grip 61 and boss 62. Lever 6 is about L-like-shaped, the grip 61 being mainly made round in section, the boss 62 rectangular in section. Also, the boss 62 is provided with a shaft bore 64 so that the pivot shaft 5 is inserted therethrough and screws at a screw thread 51 with the threaded bore 32 at the lever shaft 3, thereby supporting the auxiliary lever 6 swingably with respect to the lever shaft 3. Also, the auxiliary lever 6 is provided with an extension 65 extending outwardly from the end of boss 62. Extension 65 is bent at a right angle to the boss 62 and is provided with an interlocking portion 66 interposed between the upper end face of boss 41 at the main lever 4 and the end face of a top wall 17 at the bracket member 1. Thus auxiliary lever 6 is associated with the main lever 4 and is operated to swing the main lever 4, thereby pulling the control wire W retained to the wire retainer 20.

In addition, in the pivot shaft 5, the stem 52 has a larger diameter than the major diameter of screw thread 51, and the head 53 is larger in diameter than the stem 52.

The brake operating device of the invention constructed as abovementioned is provided with a locking means comprising a coiled spring 30 having a coil portion 30a wound onto the outer periphery of stem 52 of pivot shaft 5 and one retaining end 30b in continuation of coil portion 30a, and a retaining portion 40 provided at the lever shaft 3. Thus, when the pivot shaft 5 is intended to be unscrewed, the coil portion 30a contracts in diameter to impede the rotation of pivot shaft 5, thereby preventing looseness thereof with respect to the lever shaft 3.

The coil spring 30 is bent at one end axially to provide the retaining end 30b, and the coil portion 30a is fitted slidably onto the stem 52 at the pivot shaft 5. Retaining end 30b is retained to the retaining portion 40, so that when the pivot shaft 5 screws forwardly, the coil portion 30a is expanded in diameter by a thrust from the pivot shaft 5 and the pivot shaft 5 becomes rotatable. When the pivot shaft 5 is intended to unscrew, the coil portion 30a contracts in diameter to impede the rotation of pivot shaft 5.

Figure 2:
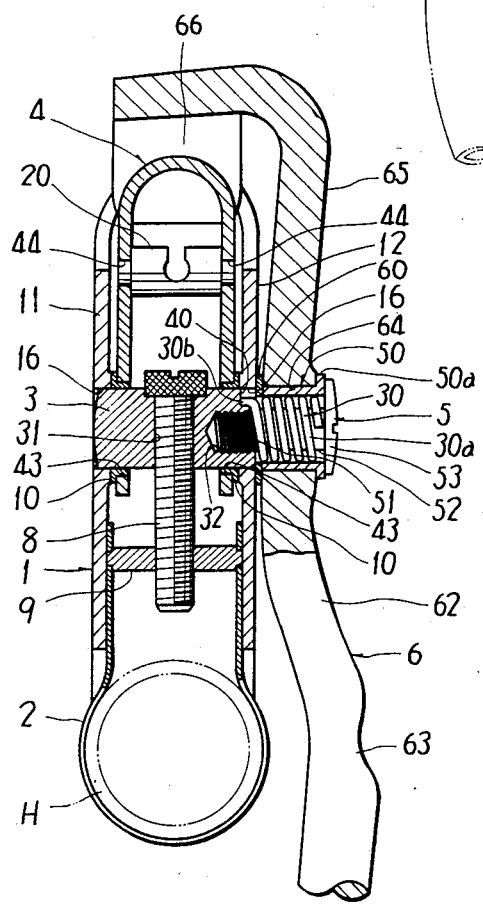
FIG. 2 is a sectional view taken on the line II—II in FIG. 1.
Figure 3:
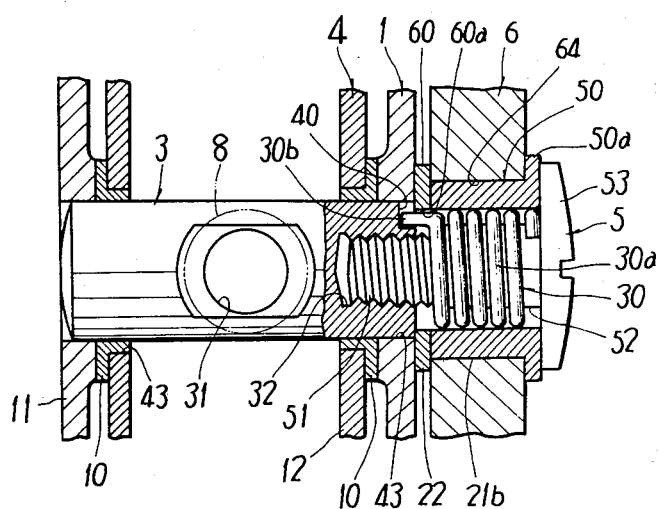
FIG. 3 is an enlarged sectional view only of the principal portion of the FIG. 1 embodiment.

Referring to FIGS. 2 and 3, the screw thread 51 at the pivot shaft 5 is right-handed screwed. Coil portion 30a at the coil spring 30 has right-handed-spirals and has an inner diameter equal to or slightly smaller than an outer diameter of stem 52 so as to be fitted thereon in a manner that the coil 30a contacts at its inner surface with the outer periphery of stem 52. The retaining end 30b is retained to the retaining portion at the axial end of lever shaft 3. The pivot shaft 5 carries a bush 50 larger in axial length than the shaft bore 64 at the auxiliary lever 6, having an inner diameter slightly larger than an outer diameter of coil portion 30a, and sleeved thereon, and a washer 60 having a center bore 60a. The pivot shaft 5 screws with the lever shaft 3 to fix the bush 50 between the head 53 of pivot shaft 5 and the outside surface of side wall 12 at the bracket member 1, and the auxiliary lever 6 is supported swingably with respect to the bush 50.

Figure 6:
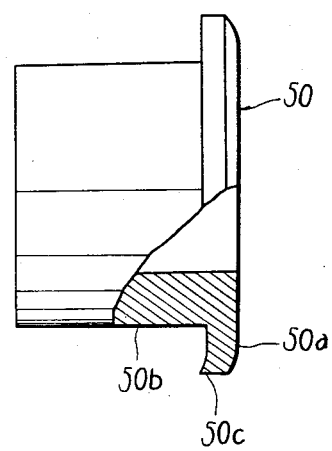
FIG. 6 is a patially cutaway front view exemplary of a bush.
Figure 4:
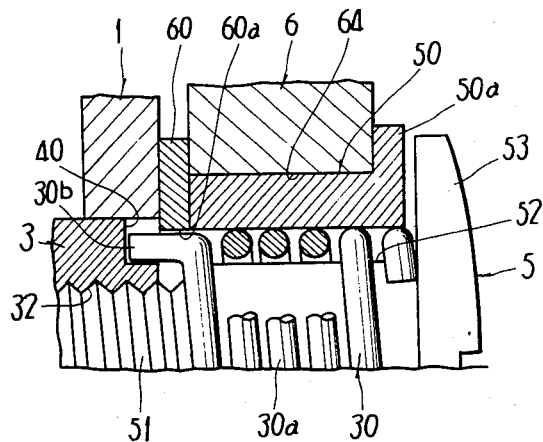
FIG. 4 is a view explanatory of a pivot shaft when screwed.
Figure 5:
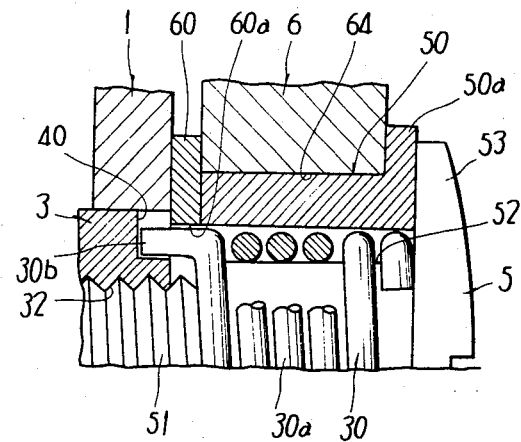
FIG. 5 is a view explanatory of the pivot shaft when locked.

Also, the bush 50 has at one axial end a flange 50a, which is warped at the outer periphery toward a trunk 50b of bush 50, as shown in FIG. 6, so that when the pivot shaft 5 screws with the lever shaft 3, the warped portion 50c at the flange 50a is elastically deformed outwardly while contacting with the outside surface of auxiliary lever 6. Hence an elastic restoring force of warped portion 50c prevents play of auxiliary lever 6 with respect to the bush 50. Incidentally, the warped portion 50c aims at preventing play of auxiliary lever 6 caused by wearing at the contact surface thereof with the flange 50a as well as the same caused when assembled.

In addition, the washer 60 has an outer diameter larger than a diameter of shaft bore 64 at the auxiliary lever 6, and the center bore 60a is made smaller in diameter than an outer diameter of coil portion 30a so that the center bore 60a can engage with the coil portion 30a to be held by the coil spring 30. Hence, the pivot shaft 5, coil spring 30, bush 50 and washer 60 can be connected in unit to screw with the lever shaft 3, so that the auxiliary lever 6 can be assembled with remarkably improved workability. In this case, the coil portion 30a is preferable to be uniform in outer diameter, but may be larger in an outer diameter of the outermost coil only.

In the brake operating device of the invention constructed as foregoing, the coil spring 30 is fitted onto the stem 52 of pivot shaft 5. Bush 50 is fitted onto the coil spring 30 and is then inserted into the shaft bore 64. Washer 60 is fitted onto the outermost end of coil portion 30a coming out from the end of bush 50, and the pivot shaft 5 screws at its screw thread 51 with the threaded bore 32 at the lever shaft 3. Coil spring 30 is retained at its retaining end 30b to the retaining portion 40 at the lever shaft 3, and the bush 50 is fixed to the lever shaft 3. Auxiliary lever 6 is supported swingably with respect to the bush 50.

The coiled spring 30, which is slidable at the coil portion 30a on the stem 52 and retained at only one end, is expanded in diameter by a thrust of pivot shaft 5 when screwed, whereby the coil portion 30a moves away from the outer periphery of stem 52 and becomes larger in an inner diameter larger than the outer diameter thereof. Thus pivot shaft 5 is allowed to reliably screw with the threaded bore 32 at the lever shaft 3.

On the other hand, in a case where the pivot shaft 5, e.g., when the auxiliary lever 6 is frequently operated or subjected to vibrations during the bicycle's running, is intended to unscrew, the coil spring 30 immediately contracts in diameter to tightly hold the pivot shaft 5 to impede its looseness.

Also, in a case where the pivot shaft 5 is required to be replaced or repaired, an unscrewing force overcoming the tightening force of coil spring 30 is given to the pivot shaft 5.

Alternatively, the retaining portion 40 for the coil spring 30 may be provided at the bracket member 1.

Also, a left-handed spiral coil may be used to a left-handed screw thread.

It is preferable to provide an inner clip washer between the flange 50a of bush 50 and the head 53 of pivot shaft 5.

As seen from the above, the brake operating device of the invention provides the coil spring comprising the coil portion wound onto the pivot shaft through which the auxiliary lever is mounted to the lever shaft and one retaining end, and also provides a retaining portion therefor. As a result when the pivot shaft is subjected to an unscrewing force, the spring contracts in diameter to tightly hold the pivot shaft to reliably prevent looseness thereof. On the other hand, when the auxiliary lever is mounted, the pivot shaft screws forward to expand the spring in diameter to facilitate the screwing of the same.

While an embodiment of the invention has been shown and described, the invention is not limited to the specific construction thereof, which is merely exemplary in the specification rather than limiting.

What is claimed is:

1. A brake operating device for a bicycle comprising a bracket member having a lever shaft fixed to a handle; a main lever supported swingably to said lever shaft at said bracket member; a pivot shaft having a screw thread screwable with an axial end of said lever shaft, a stem and a head; and an auxiliary lever supported swingably to said pivot shaft; said brake operating device including a locking means for preventing said pivot shaft from loosening with respect to said lever shaft, said locking means comprising a coiled spring having a coil portion wound onto an outer periphery of said pivot shaft and a retaining end in continuation of said coil portion; and a retaining portion for receiving therein said retaining end of said coil portion; so that when said pivot shaft rotates in an unscrewing direction, said coil portion at said coiled spring contracts in diameter to impede rotation of said pivot shaft.

2. A brake operating device for a bicycle according to claim 1, wherein said retaining portion of said locking means is disposed at said bracket member, said retaining end of said coiled spring being retained to said retaining portion at said bracket member.

3. A brake operating device for a bicycle according to claim 1, wherein said retaining portion of said locking means is disposed at an axial end of said lever shaft, said retaining end of said coiled spring being retained at said retaining portion at said lever shaft.

4. A brake operating device for a bicycle according to claim 1, wherein an inner diameter of said coil portion of said coiled spring is no larger than an outer diameter of said stem of said pivot shaft.

5. A brake operating device for a bicycle according to claim 1, wherein said coil portion of said coiled spring spirals in a same direction as a screwing direction of said screw thread at said pivot shaft.

6. A brake operating device for a bicycle according to claim 1, wherein said auxiliary lever has a shaft bore through which said auxiliary lever is pivoted to said pivot shaft, said pivot shaft being larger in axial length than said shaft bore and further comprising a bush covering said coil portion of said coiled spring, said bush being fixed to said lever shaft through screwing of said pivot shaft with said lever shaft.

7. A brake operating device for a bicycle according to claim 6, wherein said pivot shaft further comprises a washer having an outer diameter larger than a diameter of said shaft bore of said auxiliary lever, said washer having a central bore of a diameter smaller than an outer diameter of said coil portion of said coiled spring for engaging an outer periphery of said coil portion of said coiled spring to thereby be held therewith, said pivot shaft, coiled spring, bush and washer being capable of being held to said auxiliary lever before said pivot shaft screws with said lever shaft.

* * * * *